(12) United States Patent
Guay et al.

(10) Patent No.: US 7,823,272 B2
(45) Date of Patent: Nov. 2, 2010

(54) SYSTEMS FOR PRODUCING ASSEMBLIES

(75) Inventors: Matthew J. Guay, North Attleboro, MA (US); Robert Genovisi, Rehoboth, MA (US); Stephen A. Green, Franklin, MA (US); Norbert Binkowski, Franklin, MA (US); Craig Stephen Vickery, Reading, MA (US); Jon Fraser Ewing, Reading, MA (US); Ingomar JK Summerauer, Arbon (CH)

(73) Assignee: The Gillette Company, Boston, MA (US)

( * ) Notice: Subject to any disclaimer, the term of this patent is extended or adjusted under 35 U.S.C. 154(b) by 1023 days.

(21) Appl. No.: 11/598,877

(22) Filed: Nov. 14, 2006

(65) Prior Publication Data

US 2008/0110230 A1 May 15, 2008

(51) Int. Cl.
*B23P 19/00* (2006.01)
(52) U.S. Cl. .................. 29/820; 29/896.6; 29/564.1; 72/71; 72/293; 30/40.1
(58) Field of Classification Search .................. 29/820, 29/785, 783, 744, 17.1, 564.1; 72/311, 293, 72/235, 379.2; 76/104.1, 116; 30/34.1, 50, 30/41, 535, 538; 219/121.14, 121.29
See application file for complete search history.

(56) References Cited

U.S. PATENT DOCUMENTS

| | | | |
|---|---|---|---|
| 3,437,785 A | 4/1969 | Sciaky | |
| 3,592,996 A | 7/1971 | Sayer | |
| 3,768,135 A * | 10/1973 | Maguire | 29/820 |
| 3,953,186 A * | 4/1976 | Howey | 156/394.1 |
| 4,011,982 A | 3/1977 | Marancik | |
| 4,063,357 A | 12/1977 | Francis | |
| 4,084,316 A | 4/1978 | Francis | |
| 4,658,110 A | 4/1987 | Miller et al. | |
| 4,771,519 A * | 9/1988 | Strout | 29/17.1 |
| 5,293,768 A * | 3/1994 | Lazarchik et al. | 72/311 |
| 5,603,853 A | 2/1997 | Mombo-Caristan | |
| 6,441,335 B1 | 8/2002 | Nagaoka | |
| 6,629,475 B1 | 10/2003 | Neamtu et al. | |
| 2004/0221460 A1 | 11/2004 | Neamtu et al. | |

FOREIGN PATENT DOCUMENTS

| | | |
|---|---|---|
| EP | 558880 | 9/1992 |
| FR | 2330490 | 8/1975 |
| WO | WO 98/38017 | 9/1998 |

* cited by examiner

*Primary Examiner*—Minh Trinh
(74) *Attorney, Agent, or Firm*—John M. lipchitz; Kevin C. Johnson; Steven W. Miller

(57) ABSTRACT

This invention relates to methods and systems for attaching components to strips of material to form assemblies, e.g., a system for fastening pre-sharpened razor blades to individual support strips on a continuous band of material, such as a metal, to form discrete blade assemblies.

19 Claims, 13 Drawing Sheets

SYSTEMS FOR PRODUCING ASSEMBLIES

TECHNICAL FIELD

This invention relates to systems and methods for producing assemblies, and more particularly to systems for attaching components to strips of material to form assemblies.

BACKGROUND

In various industries, consumer products are mass-produced on production lines in which components are fastened to other components at a high rate of speed. For example, in the preparation of razor blade cartridges, some of the components must be fastened, e.g., welded, to other components before they are assembled to form the finished cartridge. A key parameter of these production lines is the throughput, or parts per minute, that they can produce.

SUMMARY

The invention is based, in part, on the discovery that multiple operations can be performed in a single press machine, to produce assemblies at high rates of speed.

In general, the invention features systems for attaching strips of material to components to form assemblies. The systems include a supply station that dispenses a long band of material and a press station. The press station includes a die module that cuts individual strips from the band of material, wherein the individual strips remain connected to the band of material by one or more uncut portions; a receiving module that feeds a series of components into the press station and associates a single component with each individual strip in the band of material; a fastening module that connects one component to each individual strip in the band of material; and a scrap removal module that removes scrap from the individual components without breaking the connection, thereby forming individual assemblies.

In various embodiments, the press station can optionally include a cleaning module that removes contaminants from the individual strips of material cut from the band of material; an in-line inspection module that measures one or more features of the assemblies and indicates a variance from a given tolerance for one or more features of the assembly; and/or a separation station that removes the assemblies from the band of material by severing the uncut portions and collects the individual assemblies in magazines. The new systems can also include a magazine changing system that exchanges full magazines in the press station with empty magazines for loading with further assemblies. The magazine changing system can include, for example, an assembly magazine handling robot that places the empty magazines in the separation station for loading.

The new systems can also include one or more additional stations, such as, for example, a material band lubricating system arranged upstream of the press station; and/or a component supply system that feeds the stream of components into the receiving module. In some cases, the system can also include a component holder changing system that automatically supplies holders containing the components to the component supply system. The component holder changing system can include, for example, a component holder handling robot that loads full component holders into the component supply system and removes empty component holders from the component supply system.

Additional stations can also include a stock welding machine that connects a first end of the band of material to a second band of material to form a semi-continuous band of material; a material band accumulator that controls the speed of feeding of the band of material to the press station; a cleaning station upstream of the press station that removes contaminants from the band of material; and/or a straightening machine that corrects deviations in the band of material before it is fed into the press station.

In some implementations, the material (i.e., the band of material) and/or the components are metal. The components can be razor blades and/or the individual strips can be razor blade supports. In some cases, the components are loose and not connected to any strip of material.

In some embodiments, the die module is a progressive die that cuts the individual strips and shapes the strips.

In some embodiments, the band of material passes continuously from the supply station to the fastening module of the press station. The receiving module can associate components with individual strips by mechanically interlocking the components with the individual strips or the band of material. In some cases, each individual strip has top and bottom surfaces, and the receiving module associates a single component with each individual strip in the band of material by attaching the components to the bottom surfaces of the individual strips.

The fastening module can include a welding unit that connects one component to each individual strip in the band of material by welding the component to the band of material. In some cases, for example, the welding unit can include a laser that spot welds the components to the individual strips.

In some cases, for example, the press station operates at a rate of between about 100 strokes per minute and about 500 strokes per minute. In some embodiments, the press station cuts, connects, and assembles at two parts per stroke. According to another aspect, the invention features systems for attaching supports to razor blades to form razor blade assemblies. The systems include a supply station that dispenses a long band of metal; and a press station. The press station can include a die module that cuts individual razor blade supports from the band of metal, wherein the individual supports remain connected to the band of metal by one or more uncut portions; a receiving module that feeds a series of razor blade components into the press station and associates a single razor blade component with each individual support in the band of metal; a welding module that welds one razor blade component to each individual support in the band of metal; and a scrap removal module that removes scrap from the individual razor blade components without breaking the weld to leave the razor blade welded to the support, thereby forming individual razor blade assemblies.

According to various embodiments, the press station can optionally include, for example, a cleaning module that removes contaminants from the individual razor blade supports cut from the band of metal; and/or an in-line inspection module that measures one or more features (e.g., weld quality, parallelism between the blade component and the associated support, and/or blade component failure) of the razor blade assemblies and indicates a variance from a given tolerance for one or more features for each assembly.

The press station can also include a separation station that removes the razor blade assemblies from the band of metal by severing the uncut portions and collects the individual razor blade assemblies in magazines. The systems can also include a magazine changing system that exchanges full magazines in the press station with empty magazines for loading with further razor blade assemblies. The magazine changing system can include a blade assembly magazine handling robot that places the empty magazines in the separation station for loading.

The new systems can also include one or more additional stations, such as, for example, a metal band lubricating system upstream of the press station that applies a lubricant to the band of metal; and/or a component supply system that feeds the series of razor blade components into the receiving module. In some cases, the system can also include a blade holder changing system that automatically supplies holders containing the razor components to the component supply system. The blade holder changing system can include, for example, a blade holder handling robot that loads full blade holders into the component supply system and removes empty blade holders from the component supply system.

The new systems can also include a cleaning station upstream of the press station that removes contaminants from the band of metal; and/or a quality assurance system downstream of the separation station that inspects one or more sample assemblies from each individual magazine.

In some embodiments, the die module is a progressive die that cuts the individual supports and bends the supports at a specific angle, e.g., about 21.5 degrees. In some cases, the welding module includes a laser that spot welds the razor blade components to the individual supports.

According to some implementations, the band of metal passes continuously from the supply station to the fastening module of the press station. In some embodiments, the receiving module associates razor blade components with individual supports by mechanically interlocking the razor blade components with the individual supports in the band of metal. In certain embodiments, each individual support has top and bottom surfaces, and the receiving module associates a single razor blade component with each individual support in the band of metal by attaching the razor blade components to the bottom surfaces of the individual supports.

In another aspect, the invention features presses including (a) a die module that cuts individual razor blade supports from a band of metal, wherein the individual supports remain connected to the band of metal by one or more uncut portions; (b) a receiving module that feeds a series of razor blade components into the press and associates a single razor blade component with each individual support in the band of metal; (c) a welding module that welds one razor blade component to each individual support in the band of metal; and (d) a scrap removal module that removes scrap from the individual razor blade components without breaking the weld to leave a razor blade welded to the support forming a razor blade assembly.

According to various embodiments, the presses can optionally include, for example, a cleaning module that removes contaminants from the individual razor blade supports cut from the band of metal; an in-line inspection module that measures one or more features (e.g., number and character of welds, inclusion of a single component with each strip, and/or alignment of the components with the strips) of the razor blade assemblies and indicates a variance from a given tolerance for one or more features for each assembly; a separation station that removes the razor blade assemblies from the band of metal by severing the uncut portions; and/or a component supply system that feeds the series of razor blade components into the receiving module.

In some cases, for example, the receiving module associates razor blade components with individual supports by mechanically interlocking the razor blade components with the individual supports in the band of metal. In some examples, the press operates at a rate of between about 100 strokes per minute and about 500 strokes per minute.

According to some implementations, the welding module includes a laser that spot welds the razor blade components to the individual supports.

In another aspect, the invention features processes for attaching strips of material to components to form assemblies. The processes include (a) obtaining a long band of material; (b) cutting individual strips from the band of material, wherein the individual strips remain connected to the band of material by one or more uncut portions; (c) optionally removing contaminants from the individual strips in the band of material; (d) feeding a series of components into a vicinity of the band of material and associating a single component with each individual strip in the band of material; (e) welding (e.g., laser spot welding) one component to each individual strip in the band of material; (f) removing scrap from the individual components without breaking the weld to form assemblies; and (g) removing the assemblies from the band of material by severing uncut portions.

In some cases, the material is metal (i.e., the band of material) and/or the components are metal. In some implementations, components are associated with individual strips by mechanically interlocking the components with the individual strips or the band of material. For example, in some cases, each individual strip has top and bottom surfaces, and the components are associated with each individual strip in the band of material by attaching the components to the bottom surfaces of the individual strips. In some cases, the components are loose and not connected to any strip of material.

In yet another aspect, the invention features processes for attaching supports to razor blades to form razor blade assemblies. The processes include (a) obtaining a long band of metal; (b) cutting individual razor blade supports from the band of metal, wherein the individual supports remain connected to the band of metal by one or more uncut portions; (c) optionally removing contaminants from the individual supports in the band of metal; (d) feeding a series of razor blade components into a vicinity of the metal band and associating a single razor blade component with each individual support in the band of metal; (e) welding one razor blade component to each individual support in the band of metal; (f) removing scrap from the individual razor blade components without breaking the weld to leave a razor blade welded to the support forming a razor blade assembly; and (g) removing the razor blade assemblies from the band of metal by severing the uncut portions.

In some embodiments, the processes can include various additional steps including, for example, cleaning the band of metal prior to cutting the individual razor blade supports. Cleaning the band of metal can include removing debris, oils, or grease from the band of metal. The new processes can also include bending the individual supports to a specific angle (e.g., about 21.5 degrees) prior to removing the contaminants; and/or inspecting the individual razor blade assemblies prior to removing the razor blade assemblies from the band of metal. Inspecting the individual razor blade assemblies can include measuring one or more features of the assemblies and indicating a variance from a given tolerance for one or more features of the assembly. The processes can also include applying a lubricant to the band of material prior to cutting the individual razor blade supports.

In certain aspects, removing the razor blade assemblies from the band of metal includes collecting the individual razor blade assemblies and storing them in a magazine.

In some embodiments, the razor blade components are associated with the individual supports by mechanically interlocking the components with the individual supports or the band of metal. For example, in some cases, each individual support has top and bottom surfaces, and the razor blade components are associated with each individual strip in the band of metal by attaching the razor blade components to the bottom surfaces of the individual supports.

In some embodiments, the process of welding comprises laser spot welding of metal or plastic.

In some cases, the razor blade components are loose and not connected to any strip of material.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION

The new systems and methods can be used to rapidly fasten individual components, such as pre-sharpened razor blades to strips (e.g., that form razor blade supports) formed from long bands of material, such as metals, e.g., steel or other alloys.

System Overview

Figure 1:
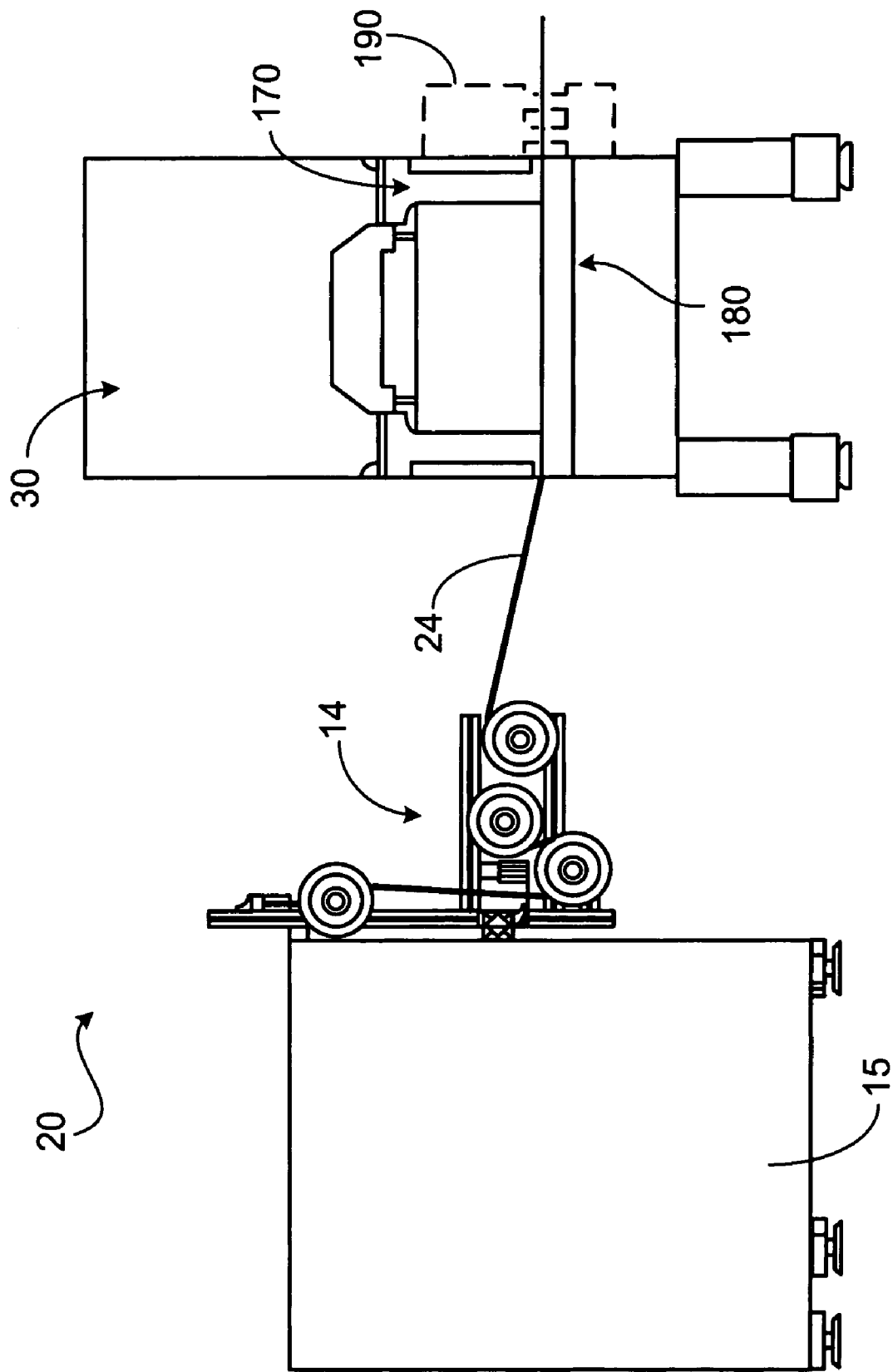
FIG. 1 is a schematic diagram of a system for producing assemblies.
Figure 2:
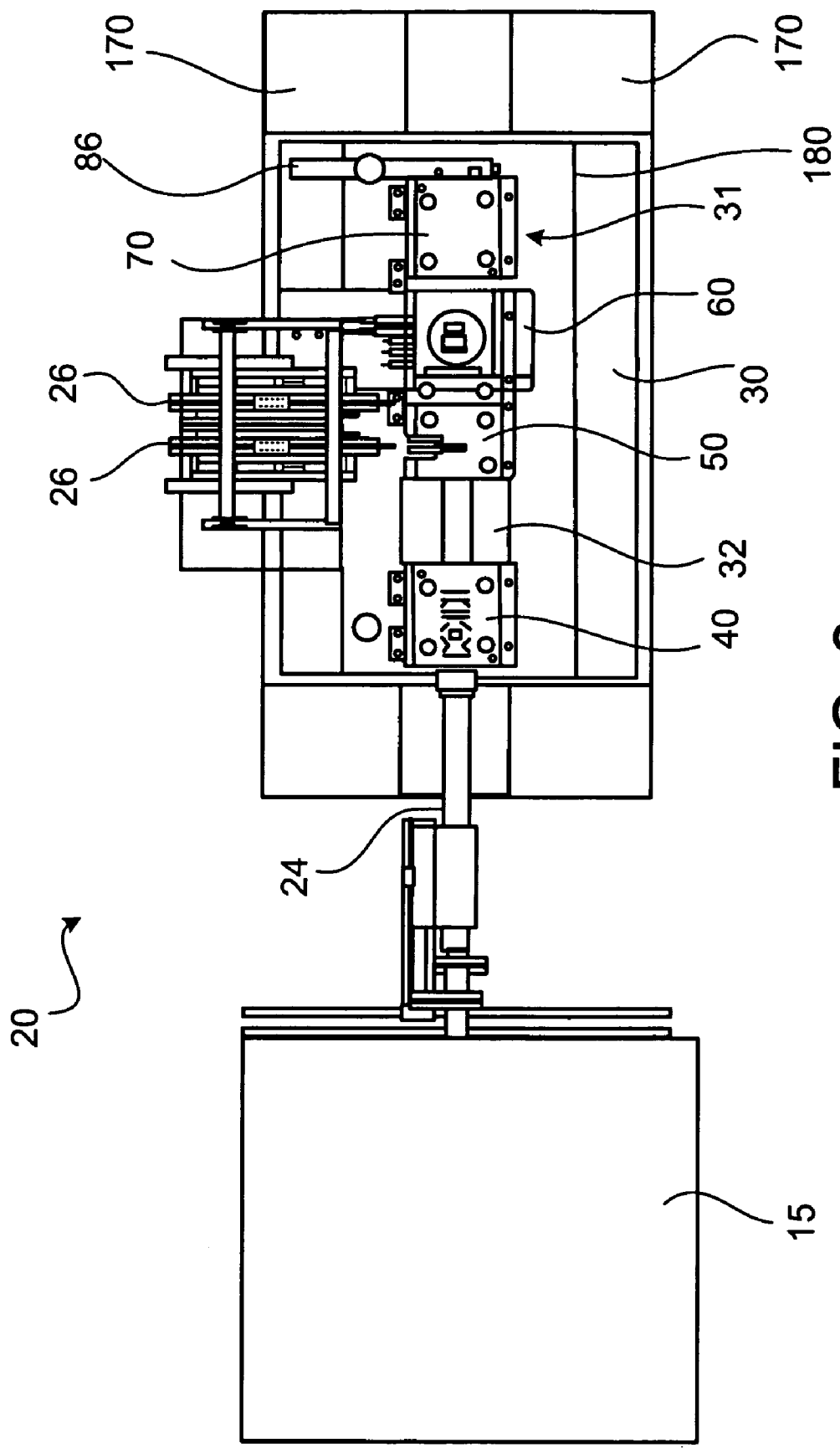
FIG. 2 is a schematic top view of the system of FIG. 1.

The new systems are used for attaching strips of material to components to form assemblies. For example, the material can be a long strip of thin metal or plastic material, e.g., rolled onto a supply disk or roll. As shown in FIGS. 1 and 2, the new systems 20 include at least two main stations including a supply station (e.g., pallet dereeler) 15 that dispenses the band of material 24 (also referred to as a carrier strip), and a press or "single-step progressive die" station 30 that is arranged to receive the band of material 24. Referring to FIGS. 4 and 8A-9, the press station 30 includes at least the following modules: (i) a die module 40 (i.e., stamping and bending module) that cuts or stamps individual strips 25 (FIG. 8A) from the band of material 24, wherein the individual strips 25 remain connected to the band of material 24 by one or more uncut portions 25A; (ii) a receiving module 50 that feeds a series of components 51 into the press station 30 and associates (and positions) one or more components 51 with each individual strip 25 in the band of material 24; (iii) a fastening module 60 that connects, e.g., by welding, gluing, riveting, or pressing, one or more components 51 to each individual strip 25 in the band of material 24; and (iv) a scrap removal module 70 that removes scrap from the individual components 51 without breaking the connection, e.g., weld 160, to form an assembly 71.

Figure 4:
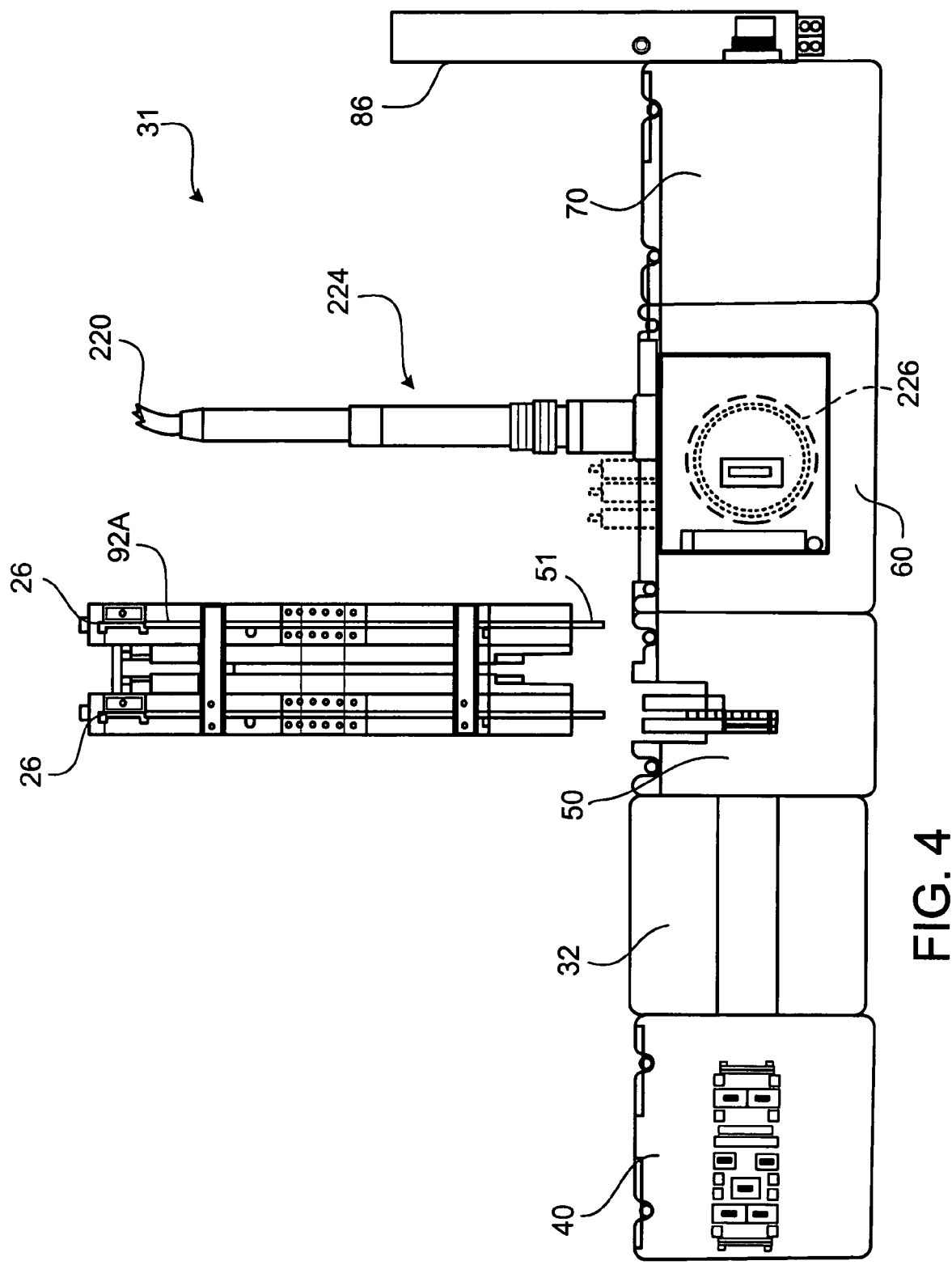
FIG. 4 is a top view of an embodiment of an in-die welding press, with six modules to handle blank stamping and forming, cleaning, blade receiving and assembly, welding, scrap removal, and in-die inspection.

As further shown in FIG. 4, the press station 30 can optionally include, (v) a cleaning module 32 that removes contaminants from the band of material 24 or from the individual strips 25 (FIG. 8A) stamped from the band of material 24 prior to the receiving module 50, and/or (vi) an in-line inspection module 86 that is used to inspect one or more, e.g., all, of the finished assemblies 71 for a variety of quality parameters, such as number and character of welds, inclusion of a single component with each strip, and the proper alignment of components with strips. The press station 30 can also include (vii) a blade assembly separating and stacking module 90 (FIGS. 5, 10, and 11) that separates the assemblies 71 from the band of material 24 and stacks them in storage racks or magazines (not shown).

Figure 3:
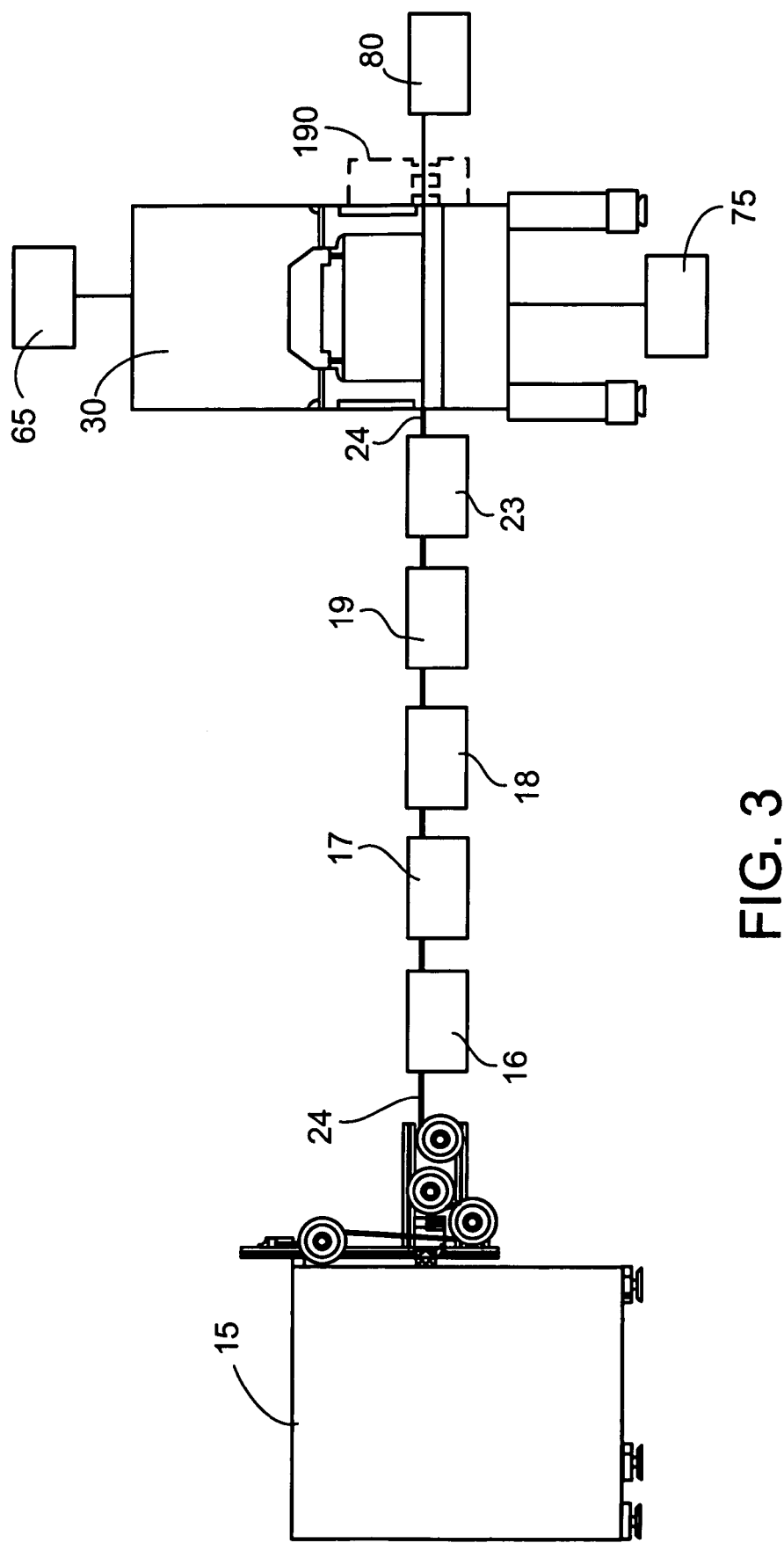
FIG. 3 is a schematic front view of the system of FIG. 1 showing additional optional stations.

FIGS. 3 and 4 show additional, optional stations. For example, the system can include one or more additional stations, such as a material band lubricating system 23 for applying a lubricant to the band of material 24, a component supply system 26 (FIG. 4) to provide a steady flow of components 51 in a controlled manner to the press station 30, a scrap discharge system 75 to remove scrap material from various locations in the system, a laser system 65 to weld the components 51 to the strips 25 (FIG. 8A), a stock welding machine 16 to connect a fresh band of material 24 to the end of a previous band of material, a band material accumulator 17 to control the speed of feeding of the band of material 24 to the press station 30, a straightening machine 18 to correct any deviation in the feed direction of the band of material, a band material cleaning station 19 to clean the band material before stamping, and a downstream quality control system 80 for inspection of individual assemblies following their separation from the band of material. Each of these stations can be made of commercially available machines.

A System for Preparing Razor Blade-Blade Support Assemblies

Figure 8A:
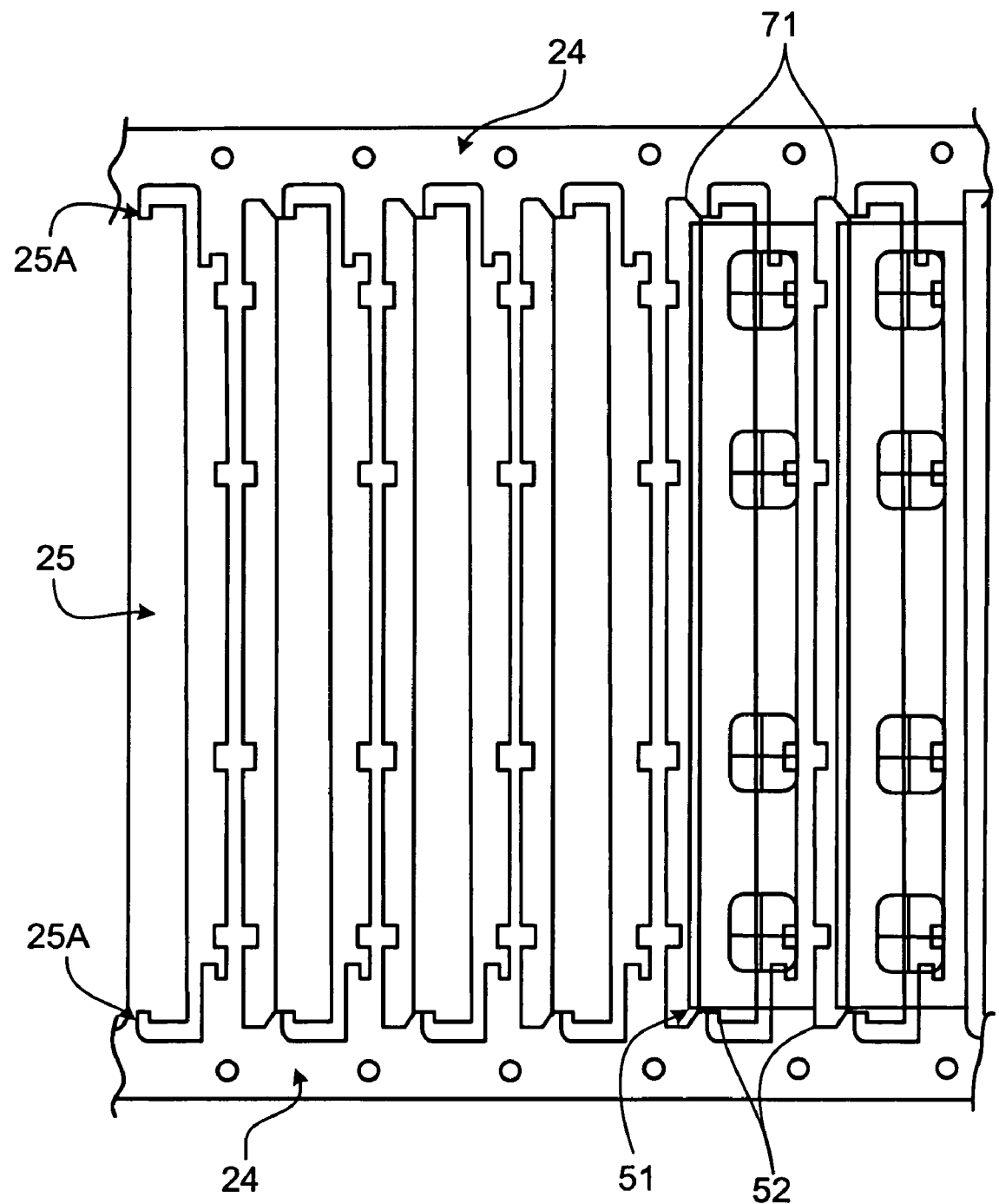
FIG. 8A is a schematic top view of a series of razor blades laid under a strip of metal band material cut and bent to form blade supports.
Figure 8B:
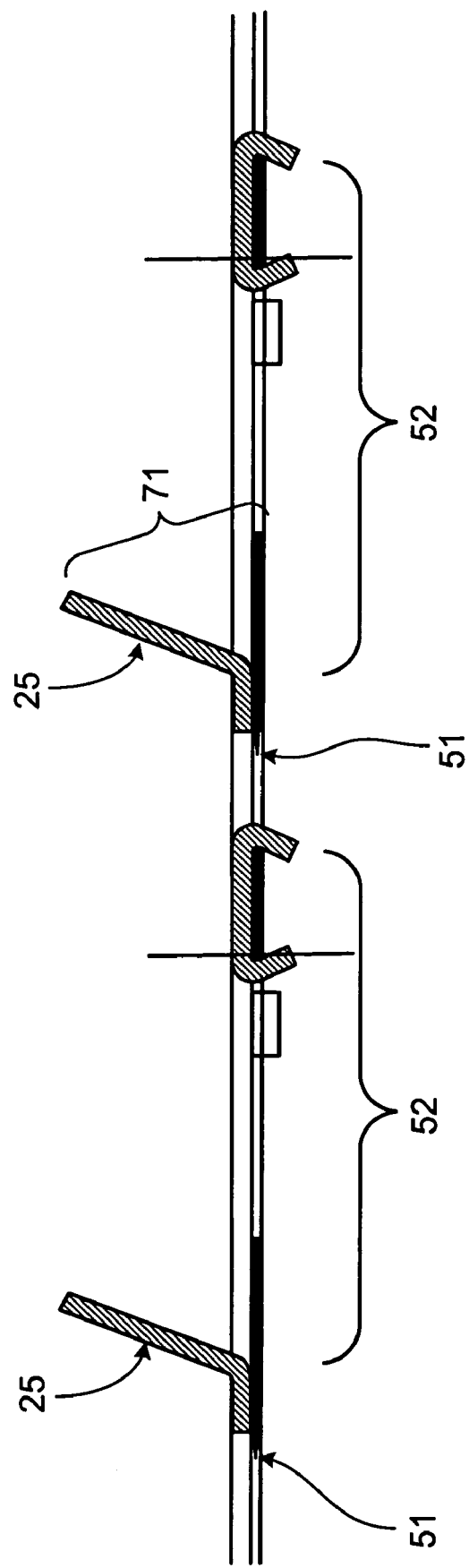
FIG. 8B is a schematic side view of the series of razor blades of FIG. 8A, shown crimped into location underneath the strip of band material.
Figure 9:
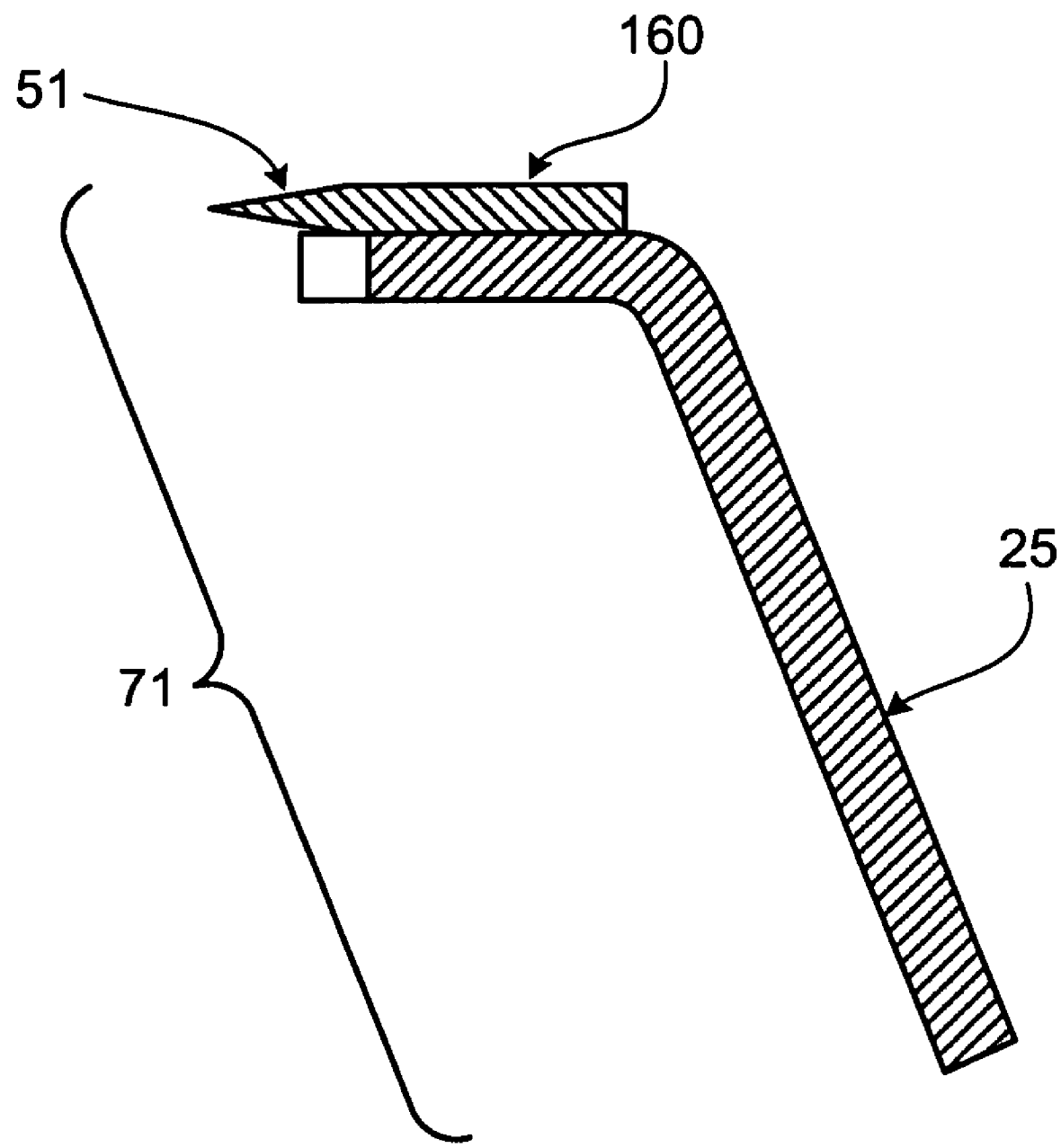
FIG. 9 is a side cross-sectional view of a razor blade welded to a blade support after separation from a strip of metal band material.

As shown in FIGS. 1 and 2, and detailed in FIGS. 8a, 8b, and 9, the new systems include at least two main stations including a supply station 15 that dispenses the long band of material 24, and a press or "single-step progressive die" station 30 that is arranged to receive a continuous band of stainless steel or other metal material. Any known supply stations used to dispense bands of material, e.g., from reels or spools, can be used.

Referring to FIGS. 2 and 4, the press station 30 includes at least the following modules: (i) a die module 40 that cuts, stamps, and forms individual razor blade supports 25 (FIGS. 8A and 8B) from the band of material 24, wherein the individual strips 25 remain connected to the band of material 24 by one or more uncut portions 25A (see, e.g., FIG. 8A); (ii) a receiving module 50 that feeds a series of razor blades 51 into the press station 30 and associates (and positions) one or more razor blades 51 with each individual razor blade support 25 in the band of material 24; (iii) a fastening module 60 that connects, e.g., by welding, one or more razor blades 51 to each support 25 in the band of material 24; and (iv) a scrap removal module 70 that removes scrap from the individual blade supports 25 without breaking the weld 160 (FIG. 9) to form a razor blade-blade support assembly 71 (FIG. 9). The press station 30 can operate at a drive speed of at least about 100 strokes per minute (SPM), e.g., between about 100 and about 500 SPM. In certain embodiments, the press station 30 can include spring dampers to avoid transmitting vibrations to the floor.

Figure 8C:
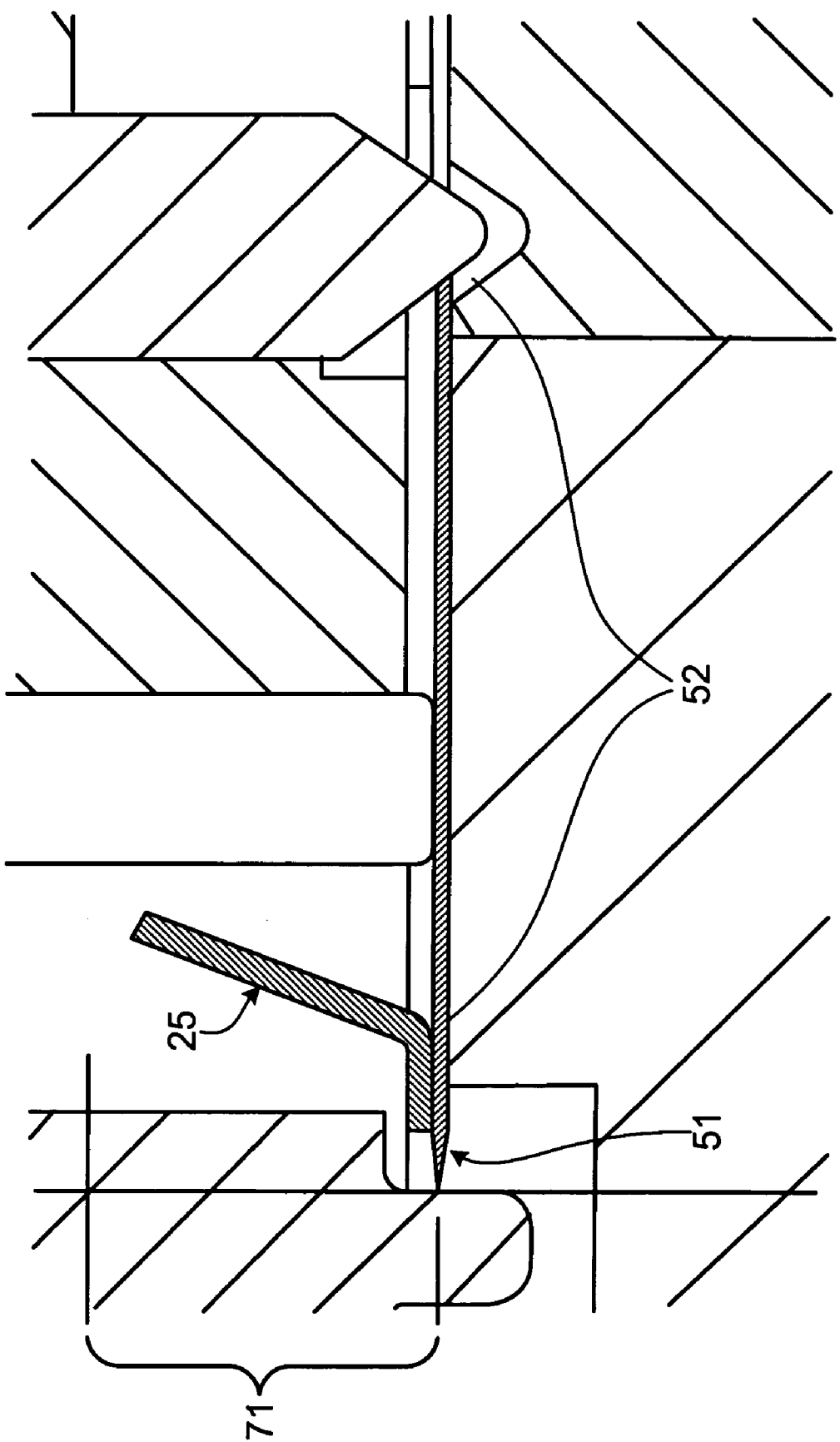
FIG. 8C is a schematic cross-section of an embodiment of a crimping tool within the die of a laser welding module at the time a razor blade blank is located and crimped onto a strip of metal band material.

Referring to FIG. 4, the heart of the press station 30 is the die 31 which cuts, shapes, cleans, assembles, welds, and separates the razor blade-blade support assemblies 71 at two parts per stroke. This type of die is referred to as a single-step, multi-station progressive production die, and can process one, two, or more bands of metal at once. The die 31 can be a high performance stamping die in a 2-up configuration with integrated multi-task functions based on a modular design concept. The die 31 in the press station 30 includes multiple modules, including a stamping and bending module 40 (in which all cutting and forming elements can be made of tungsten carbide), a cleaning module 32 (that uses a high pressure spray system and includes an integrated drying station), a blade assembly module (i.e., receiving module 50) for positioning and fixing the blades on the strip, e.g., by crimping, (with a mechanical interface to the blade supply system), a laser welding module 60 that includes fixing elements for a laser focusing unit, and a scrap cutter module 70 for scoring and breaking the blades for later separation. As shown in FIGS. 8A-8C, the blades 51 are attached to a larger piece of scrap metal (blade handling portion 52), to allow the blades to be handled without contacting the sharp edge, and this scrap metal needs to be removed to produce the finished assemblies 71 (FIG. 9).

Figure 5:
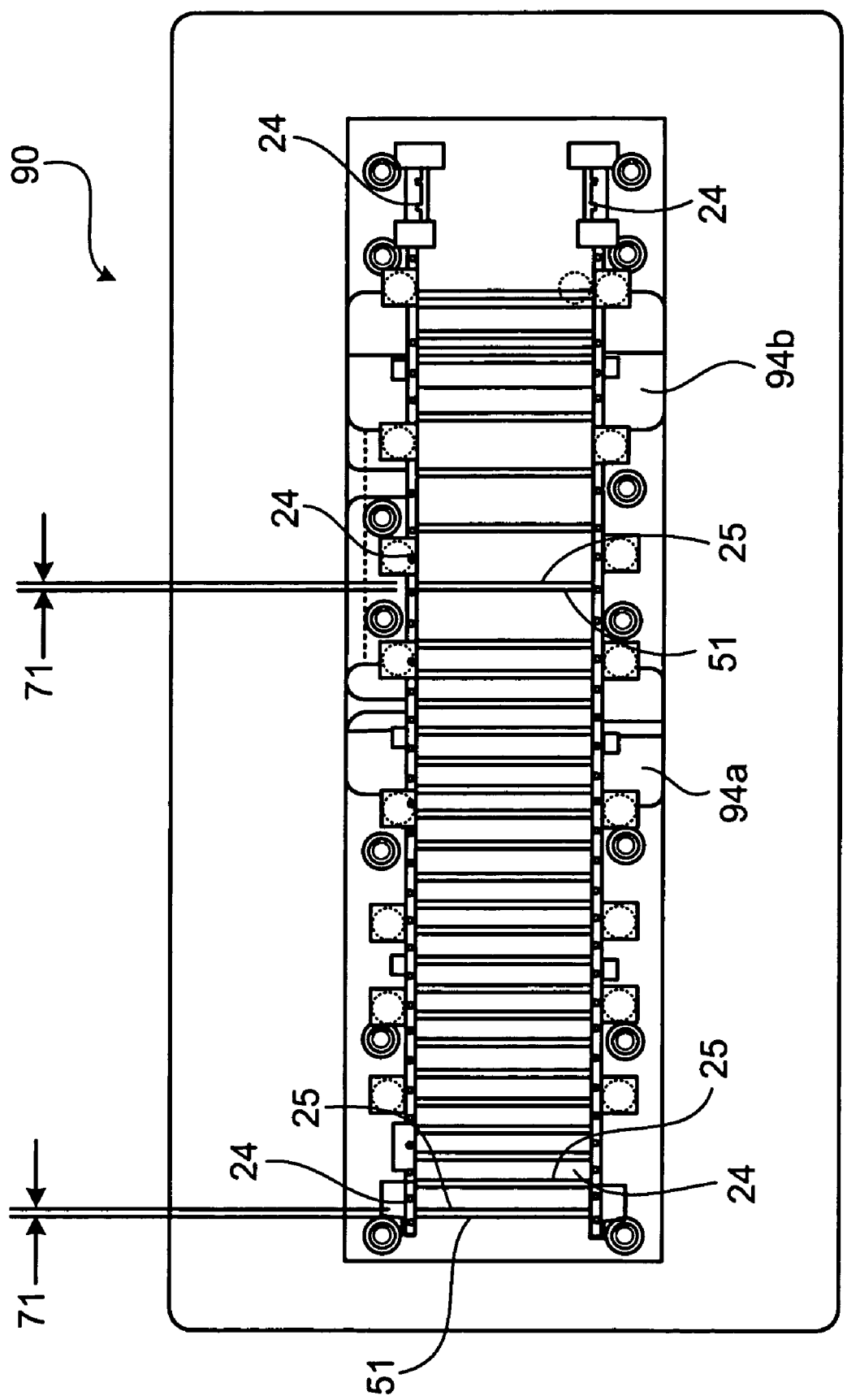
FIG. 5 is a top view of an embodiment of a seventh module of the in-die welding press; i.e., a blade assembly separating and stacking module.
Figure 11:
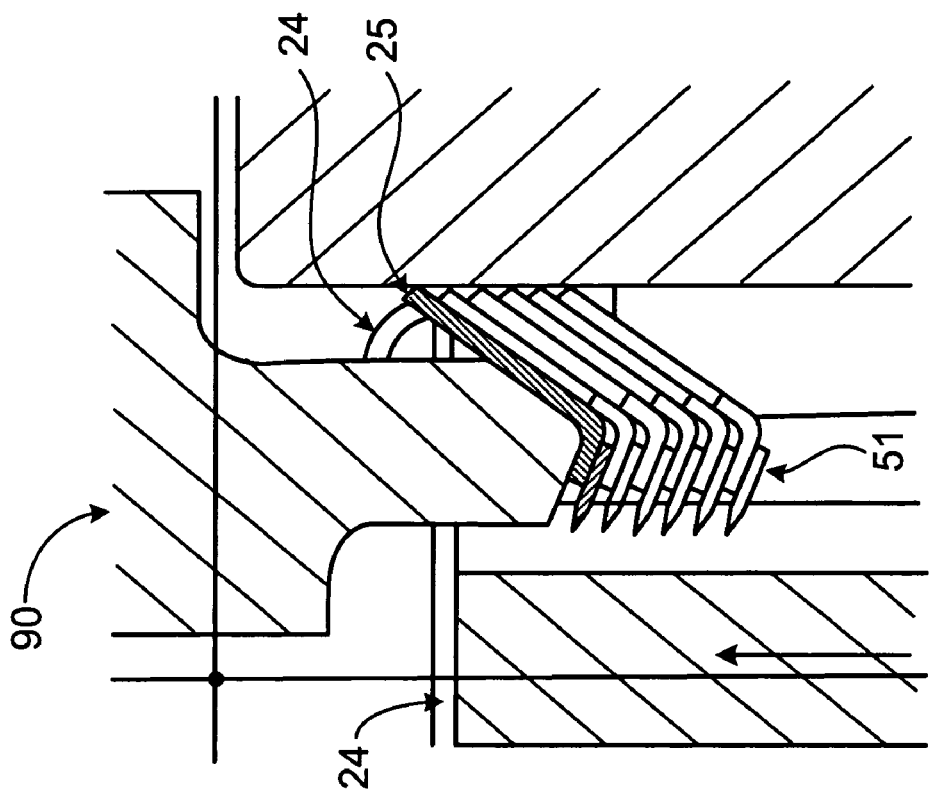
FIG. 11 is a side cross-sectional view of a series of razor blade-blade support assemblies in an embodiment of a blade assembly separating and stacking module of FIG. 5.
Figure 10:
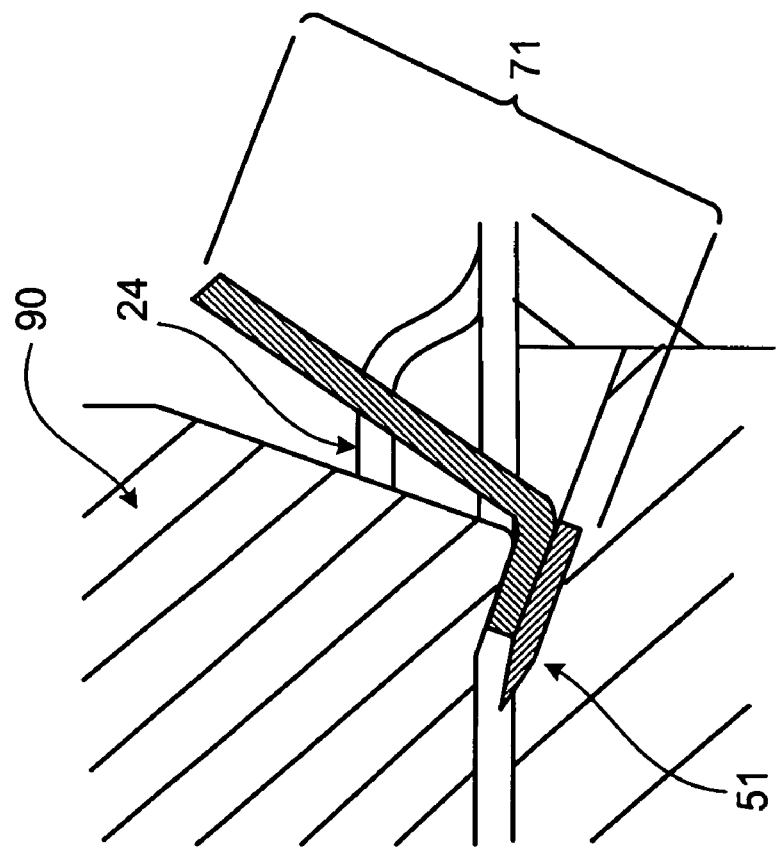
FIG. 10 is a side cross-sectional view of a razor blade-blade support assembly in a lance and orientation module just before separation from a strip of metal band material.

Once the blade-blade support assemblies 71 are produced, they are separated from the band of material 24 in a blade assembly separating and stacking module 90 as illustrated in FIG. 5. The blade assembly separating and stacking module 90 removes blade assemblies 71 from the carrier strip 24 individually at two locations 94a, 94b. The blade assembly separating and stacking module 90 twists the blade assemblies 71 into a stacking position, as shown in FIG. 10, then cuts the assemblies out of the carrier strip 24 and stacks the blade assemblies 71, as shown in FIG. 11.

We now describe the various modules of the press station 30 in further detail.

The component supply system 26 must be capable of moving loose blades 51 one by one from a stacking system into the die 31 and positioning them accurately on the strip of the stamped blade supports 25. A dual supply system (i.e., component supply system 26), shown in FIGS. 2 and 4, is mechanically driven from a main shaft of the press. The component supply system 26 (FIGS. 2 and 4) uses mechanical gripper elements with a mechanical interlock to the blade handling portions 52 (FIG. 8A) for forced blade transportation.

The press station can also include a scrap discharge system 75, shown schematically in FIG. 3. Stamping scrap is produced in two locations: (i) at the stamping and bending module 40 located at the inlet of the stamping die 31; and (ii) at the blade assembly separating and stacking unit 90 located outside the stamping die 31 between the press columns (FIGS. 5, 10, and 11). To collect the scrap a Vacuum Scrap Remover can be used, e.g., to transfer all scrap outside of the stamping die through tubing and into standard scrap containers.

Figure 6:
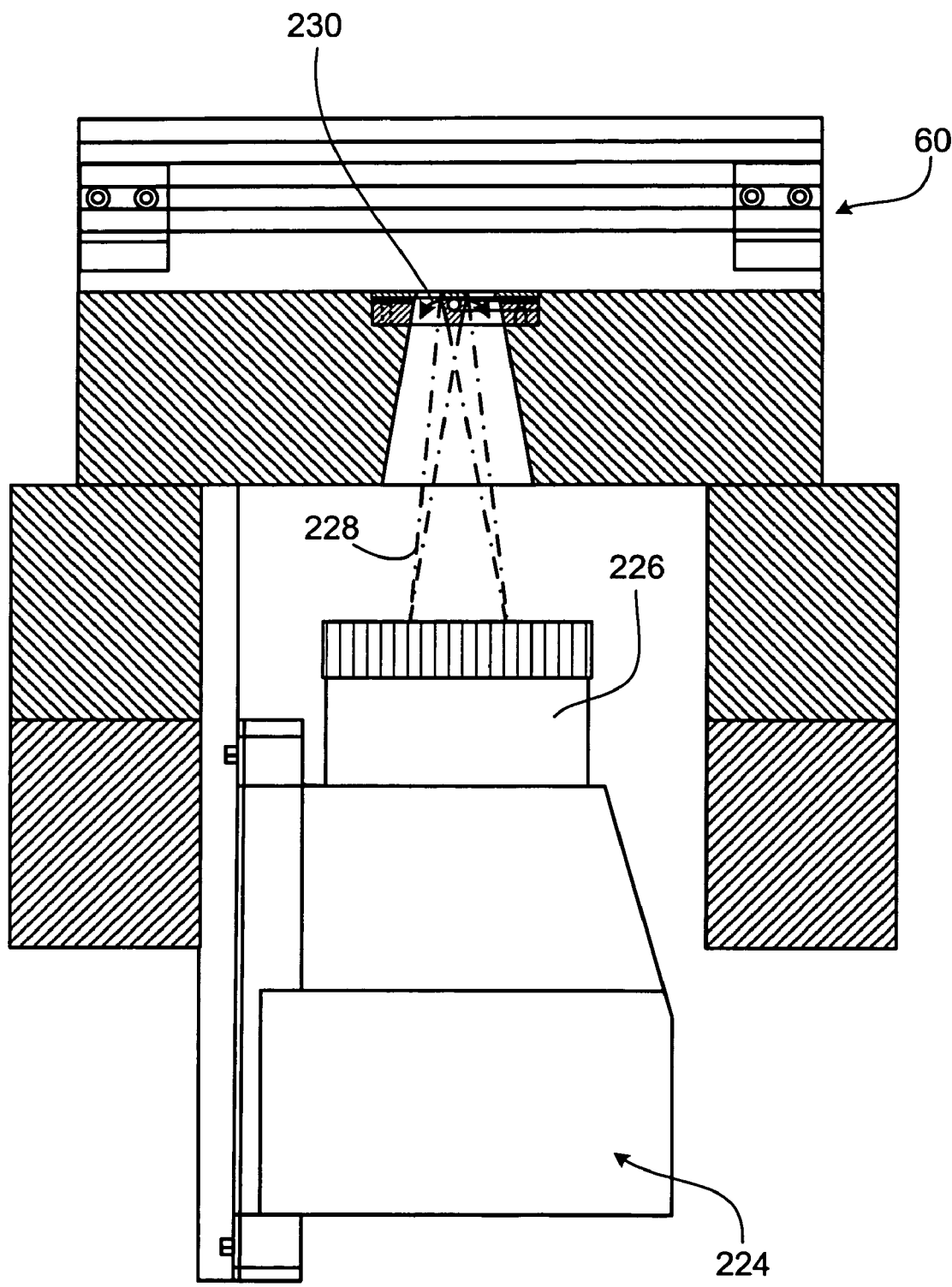
FIG. 6 is a schematic diagram of an embodiment of a laser welding module in the welding press.
Figure 7:
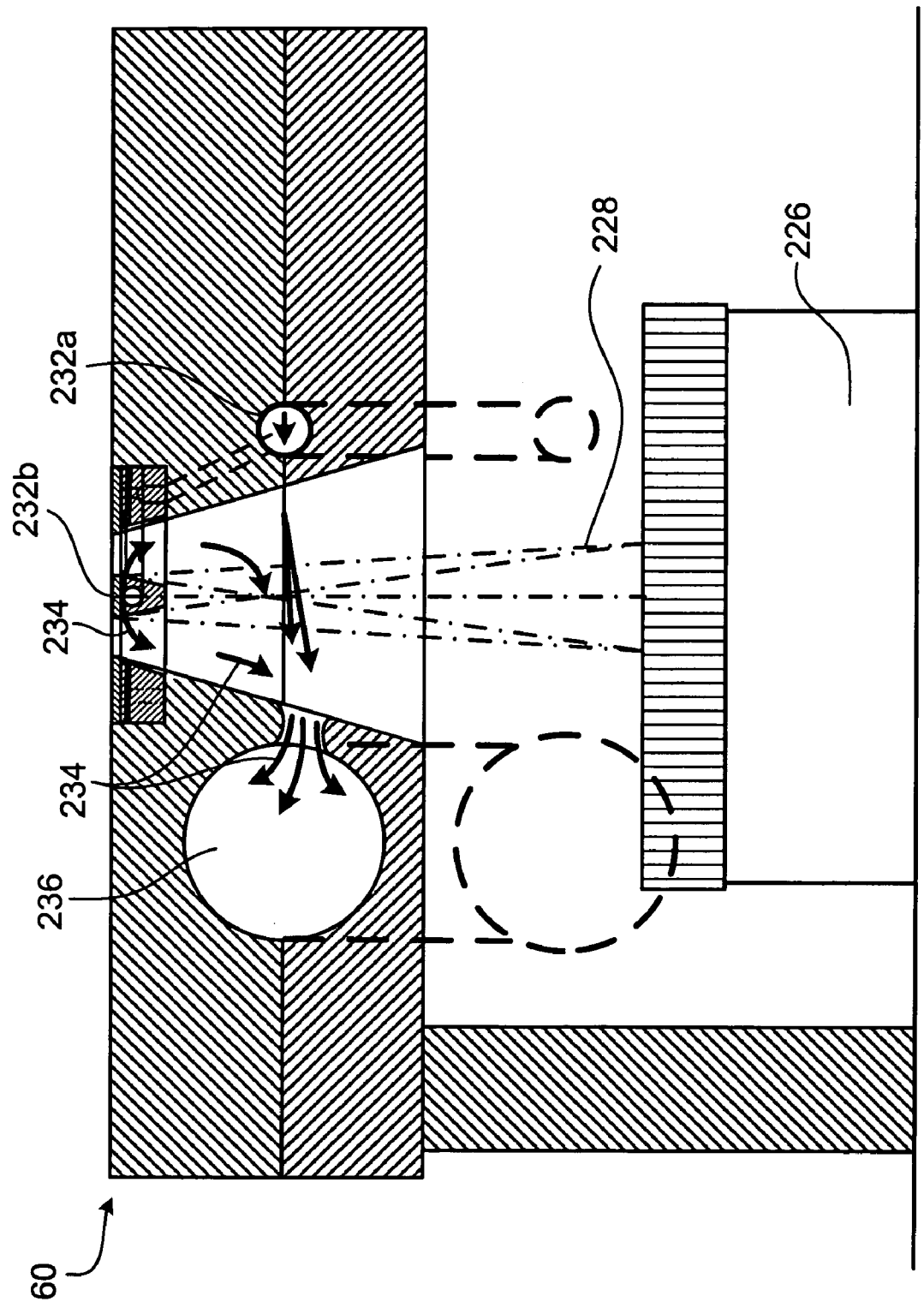
FIG. 7 is a schematic diagram of the laser welding module of FIG. 6 showing blowing and cooling channels.
Figure 12:
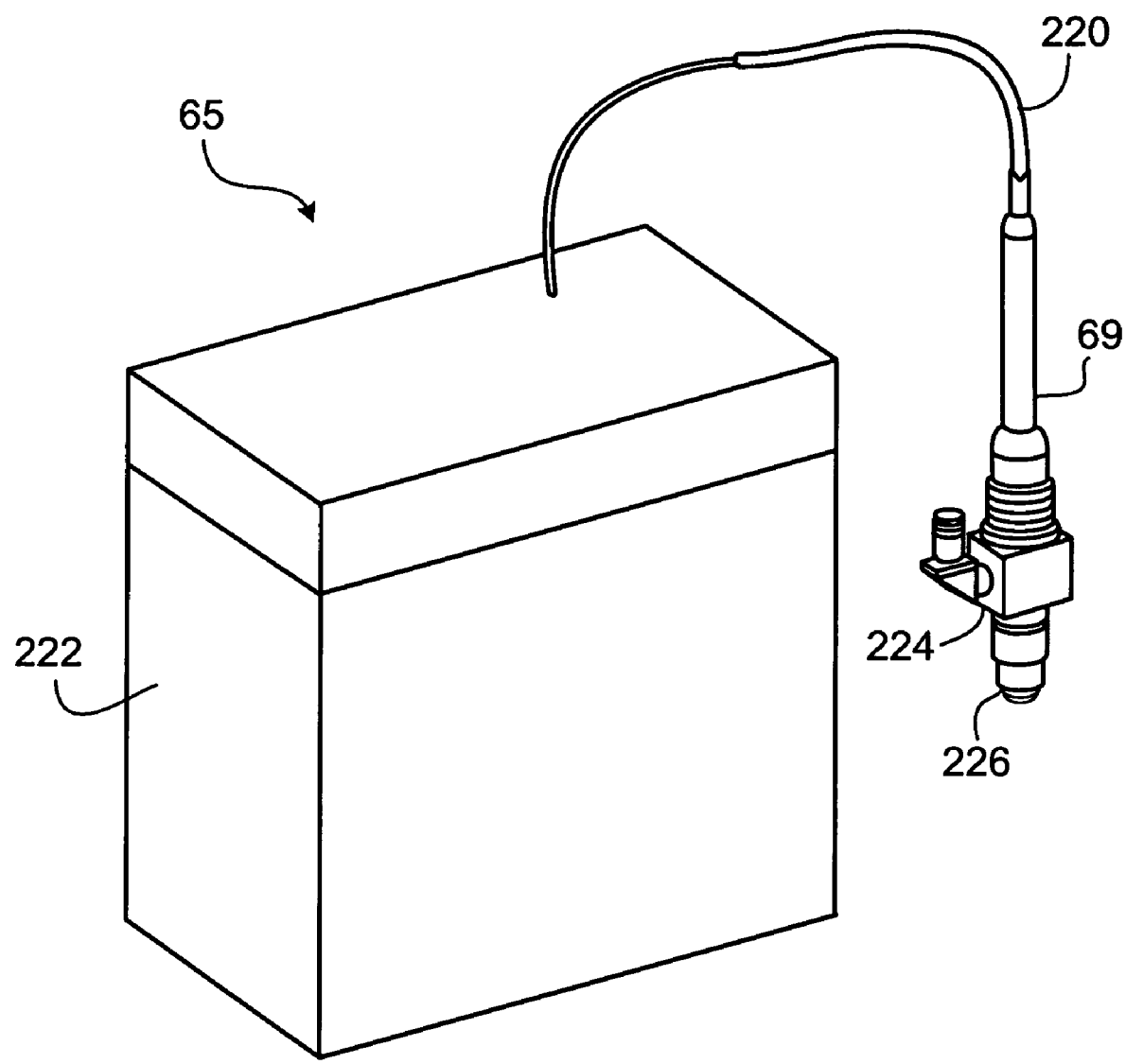
FIG. 12 is a schematic diagram of a laser system of the system of FIG. 3.

As mentioned above, the production die 31 also includes a fastening (or "welding") module 60. The welding module 60 can be, for example, part of a laser welding system 65, as shown in FIG. 3. Referring to FIGS. 6, 7, and 12, the optical parts of the laser welding system 65 include a beam guide 69 that includes a one-piece laser light cable 220 with rapid switches (e.g., 50 ms switching time). The system also includes processing (welding) optics 224 that include programmable focusing optics 226 to guide a laser beam 228 (FIG. 7) on the surface of the work piece (which is defined by the focal length). The optics 226 can have, for example, an objective F-Theta−f=90 mm, a field diameter of 60 mm, and an optical ratio of 1.

The laser light cable 220 is used for guiding a laser beam 228 from a laser device 222 (FIG. 12) to the fastening module 60 where the beam is shaped and focused by the programmable focusing optics 226. The laser welding system 65 can also include a cross-jet 230 for combined convective cooling and fume and particle extraction at the focusing optics 226, as illustrated in FIGS. 6 and 7. For example, as best shown in FIG. 7, the cross-jet 230 can include inlet ports 232a, 232b, for introducing a pressurized air stream 234 into the region between fastening module 60 and the focusing optics 226, and a vacuum port 236 for evacuating the region between the fastening module 60 and the focusing optics 226. The vacuum port 236 and inlet ports 232a, 232b work cooperatively to remove welding fumes and debris from the fastening module 60, and inhibit debris from falling onto the optics 226.

The system 20 includes a dereeler 15, to remove the band of material 24, e.g., stainless steel band, from large reels on which it is delivered. The dereeler 15 can be, for example, a double pallet dereeler for simultaneously unwinding of two strips of material. The dereeler feeds the press, which operates at a speed of 500 SPM @ 13 mm feed length, to produce two parts per stroke.

The system 20 can also include other stations, including a stock welding machine 16, to connect an end of the band of material 24 from one reel to the beginning of a new strip of material for a new reel to maintain a continuous flow of new material to the press station 30, a strip material accumulator 17, to feed the band of material 24 into the press station 30 in a continuous fashion while allowing the strip to come to a complete stop for the strip welding operation when changing reels, a straightening machine 18, for keeping the strip of material moving in the proper direction, and a strip cleaner 19.

Referring to FIG. 3, the system 20 can also include a strip cleaning station 19 for precleaning and high pressure cleaning of the strip. A cleaning medium is applied to the strip material surface with high speed resulting in excellent mechanical cleaning and degreasing. An additional cleaning module 32, as illustrated in detail in FIGS. 2 and 4, can be integrated inside the stamping die 31 as part of the cleaning system.

Methods of Operation

In general, the system operates as follows.

The band of material 24 is unrolled from one or two rolls or disks of material simultaneously. The band of material 24 is fed into an accumulator 17 to control the feed rate into the press station 30, but can also first pass through a cleaning station 19 that removes debris and oils or grease from the band of material 24.

Once the band of material 24 is cleaned, it is fed into the press station 30, where multiple steps occur with each stamp of the press. In general, the following steps occur. First, the band of material 24 is cut, with all cuts being made in a single stroke with a punch. Second, the strip material is bent into the shape of the blade supports, as shown in FIGS. 8A and 8B. This bending can occur during the same stamp of the press as the cutting, or in a second stamp, within the same die. It is important that after the cutting and bending that the individual strips 25 remain connected to the band of material 24 by one or more uncut portions 25A.

Next, the cut and bent strips 25 are optionally cleaned (again) in a cleaning module 32 that removes contaminants from the individual strips 25 in the band of strip material 24. Thereafter, the receiving module 50 feeds a series of components 51 into the press station 30 and associates a single component 51 with each individual strip 25 in the band of strip material 24. The receiving module 50 includes component supply system 26, which delivers the components 51 one by one from blade or component holders 92A (FIG. 4) to their crimping position in receiving module 50. As components 51 are consumed in the assembly process, empty blade holders (not shown) in the component supply system 26 are replaced with full blade holders (not shown), e.g., by hand or with the aid of an automated robotic system. After exiting the receiving module 50, the individual strips 25 and associated components 51 are fed into the fastening module 60. As illustrated in FIGS. 8C and 9, the fastening module 60 connects, e.g., by welding, each component 51 to its associated strip 25 in the band of material 24, thereby forming an assembly 71. In a final operation within the press station 30 (which is also optional, depending on the nature of the assemblies to be made), a scrap cutter module 70 removes scrap, e.g., handling portion 52, from the individual components 51 without breaking the connection, e.g., weld 160 (FIG. 9).

Thereafter, an assembly separation and stacking module 90 can be used to remove the assemblies 71 from the band of material 24 by severing the uncut portions 25A. This module can be installed between the right-side press columns 170 outside the bolster plate 180 and driven from the right-side face of the press slide 190. As shown in FIGS. 5, 10 and 11, the assembly separating and stacking module 90 twists the assemblies 71 into a stacking position (FIG. 10) then cuts the assemblies 71 out of the band of material 24 and stacks the assemblies 71 (FIG. 11), e.g., in blade assembly magazines (not shown). Empty blade assembly magazines are supplied to the assembly separation and stacking module 90, e.g., by hand or with the aid of an automated robotic system.

Applications

As previously mentioned, the invention can be utilized in the formation of razor blade assemblies; however, the scope of the invention extends to a variety of other applications, such as manufacture, formation, and/or assembly of any multi-part components in which parts need to be cut, assembled, and fastened together, e.g., electronic components and devices, biological and medical sensors and diagnostic devices, and batteries. For example, the systems and methods described above can be employed in the formation of discrete electronic components such as capacitors and/or batteries, which typically include a pair of conductive plates (electrodes) and a pair of corresponding terminals each bonded (e.g., by welding) to an associated one of the electrodes. Thus, at least a part of a capacitor or battery can be formed with the systems described above, e.g., by cutting one or more electrodes from a continuous band of material (e.g., metal), aligning a terminal (e.g., conductive metal filament) with each electrode and welding the pieces together.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system (20) for attaching strips of material (25) to components (51) to form assemblies (71), the system comprising
   (a) a supply station (15) that dispenses a long band of material (24); and
   (b) a press station (30) that comprises
   (i) a die module (40) that cuts individual strips (25) from the band of material, wherein the individual strips (25) remain connected to the band of material (24) by one or more uncut portions (25A);
   (ii) a receiving module (50) that feeds a series of components (51) into the press station (30) and associates a single component (51) with each individual strip (25) in the band of material; and
   (iii) a fastening module (60) that connects one component (51) to each individual strip (25) in the band of material (24).

2. The system of claim 1, wherein the press station (30) further comprises a scrap removal module (70) that removes scrap from the individual components (51) without breaking the connection to form individual assemblies (71).

3. The system of claim 1, wherein the press station (30) further comprises a cleaning module (32) that removes contaminants from the individual strips (25) of material cut from the band of material (24).

4. The system of claim 1, wherein the press station (30) further comprises an in-line inspection module (86) that measures one or more features of the assemblies (71) and indicates a variance from a given tolerance for one or more features of the assembly (71).

5. The system of claim 1, further comprising a separation module (90) that removes the assemblies (71) from the band of material (24) by severing the uncut portions (25A).

6. The system of claim 1, further comprising a component supply system (26) that feeds the stream of components (51) into the receiving module (50).

7. The system of claim 1, wherein the material (24) is metal.

8. The system of claim 1, wherein the material (24) is metal and the individual strips (25) are razor blade supports.

9. The system of claim 1, wherein the components (51) are metal.

10. The system of claim 1, wherein the components (51) are razor blades.

11. The system of claim 1, wherein the components (51) are loose and not connected to any strip of material.

12. The system of claim 1, wherein the die module (40) is a progressive die that cuts and shapes the individual strips (25).

13. The system of claim 1, wherein the band of material (24) passes continuously from the supply station (15) to the fastening module (60) of the press station (30).

14. The system of claim 1, wherein the receiving module (50) associates components (51) with individual strips (25) by mechanically interlocking the components (51) with the individual strips (25) or the band of material (24).

15. The system of claim 1, wherein each individual strip (25) has top and bottom surfaces, and the receiving module associates a single component (51) with each individual strip (25) in the band of material (24) by attaching the components (51) to the bottom surfaces of the individual strips (25).

16. The system of claim 1, wherein the fastening module (60) comprises a welding unit that connects one component (51) to each individual strip (25) in the band of material (24) by welding the component (51) to the band of material (24).

17. The system of claim 16, wherein the welding unit comprises a laser that spot welds the components (51) to the individual strips (25).

18. The system of claim 1, wherein the press station (30) operates at a rate of between about 100 strokes per minute and about 500 strokes per minute.

19. The system of claim 1, wherein the press station (30) cuts, connects, and assembles at two parts per stroke.

* * * * *